United States Patent [19]

Murakami et al.

[11] 4,370,352

[45] * Jan. 25, 1983

[54] NON-FRIED INSTANT COOKING DRY NOODLES

[75] Inventors: Sanpei Murakami, Osaka; Sadao Kokeguchi, Ibaragi; Hiroshi Takahashi, Suita; Ken Okada, Osaka, all of Japan

[73] Assignee: Kanebo Foods, Ltd., Tokyo, Japan

[*] Notice: The portion of the term of this patent subsequent to Jan. 6, 1998, has been disclaimed.

[21] Appl. No.: 221,514

[22] Filed: Dec. 30, 1980

Related U.S. Application Data

[63] Continuation-in-part of Ser. No. 197,211, Oct. 15, 1980, abandoned, and Ser. No. 1,352, Jan. 4, 1979, Pat. No. 4,243,680.

[51] Int. Cl.³ .............................................. A23L 1/16
[52] U.S. Cl. .................................................. 426/557
[58] Field of Search ............... 426/557, 451, 242, 511

[56] References Cited

U.S. PATENT DOCUMENTS

| | | | |
|---|---|---|---|
| 2,037,042 | 4/1935 | Perewe | 426/557 |
| 2,677,613 | 5/1954 | Shiah | 426/557 |
| 3,718,480 | 2/1973 | Tremblay | 426/242 |
| 3,846,563 | 11/1974 | Cunningham | 426/557 |
| 4,098,906 | 7/1978 | Hieaki et al. | 426/557 |
| 4,208,439 | 6/1980 | Hsu | 426/557 |

*Primary Examiner*—Raymond N. Jones
*Assistant Examiner*—Elizabeth A. Hatcher
*Attorney, Agent, or Firm*—Cushman, Darby & Cushman

[57] ABSTRACT

Non-fried, oil-free instant cooking dry noodles which, when immersed in hot water, are easily transformed to an edible cooked state during a short period of time and give good sense, feel and taste. The noodles have a water content of 13% or less by weight and consist essentially of at least one starch-containing component comprised mainly of wheat flour, wherein the starch in the starch-containing component has an α-conversion degree of at least about 85% as measured by diastase enzyme process. These noodles have a fine porous texture providing communication between the external surfaces and the internal portions thereof by a network of fine pores, and have smooth surfaces devoid of blister-like bubble formations or mutually sticking portions. Further, the noodles can be stored stably for at least one year without developing substantial change in quality.

12 Claims, 10 Drawing Figures

NON-FRIED INSTANT COOKING DRY NOODLES

CROSS REFERENCE TO RELATED APPLICATION

This application is a continuation-in-part of both of our earlier applications Ser. No. 1,352 filed Jan. 4, 1979, now U.S. Pat. No. 4,243,680 issued Jan. 6, 1981 and Ser. No. 197,211 filed Oct. 15, 1980 and now abandoned.

BACKGROUND OF THE INVENTION (a) Field of the Invention

The present invention relates to non-fried oil-free instant cooking dry noodles, and more particularly it pertains to noodles of this type having elongated cord-like shape, which are free of stickiness and agglutination to each other, are easily releasably from entaglement during the manufacturing process, whose surfaces are smooth with no blister-like bubble formations thereon and which can be converted to satisfactory boiled condition in a very short period of time by immersion in hot water.

(b) Description of the Prior Art

One known method for manufacturing non-fried dry instant cooking noodles includes the steps of adding water to starch components, which consist mainly of wheat flour, uniformly distributing the added water throughout the starch components by kneading, subjecting the resulting mixture to rolling to provide a long web of raw starting material, then cutting this web with a wave-shaped cutter blade into individual, long cord-like raw noodles, thereafter subjecting these noodles to steaming to effect α-conversion of the starch components, and then drying the resulting noodles. Another known method comprises extruding such a mixture under pressure to provide a long web of raw starting material, and then subjecting this web to same steps as mentioned above. Still another known method directly extrudes the mixture through a die to provide individual elongated cord-like raw noodles and thereafter subjecting these noodles to the steps mentioned above.

These known methods have the disadvantages and inconveniences such that the elongated individual cord-like raw noodles so obtained are not of a straight form but they are wavy or crimped in configuration. In this form the noodles become swollen during the step of steaming, causing the individual noodles to stick to each other so that α-conversion of the starch components therein does not take place uniformly throughout the noodles. This in turn leads to the difficulty that the final dry product noodles can not be uniformly converted to the boiled or cooked state when immersed in hot water, thus failing to give such satisfactory feel, sense and taste as would be expected of cooked or boiled noodles. As for the noodles which are manufactured by extrusion of the dough into a web of starting material, and the dry noodles made by direct extrusion of the dough into individual cord-like noodles, both invariably experience the undesirable consequence that the mixture is subjected to excessive kneading during the extrusion process. As a consequence the texture of the raw material is rendered excessively dense, lowering the ability of the dry noodles to be satisfactory transformed to the cooked or boiled state when immersed in hot water for a short period of time. Further, the sense, feel and taste, including what is called "al dente," noted at the time these noodles are eaten become very poor. As used in the following description we include, for evaluation of the cooked noodles, the "al dente" state.

One procedure that has been proposed to improve these disadvantages and inconveniences includes mixing starch components which consist mainly of wheat flour with an emulsion of an oil-in-water phase edible oil, subjecting the resulting raw mixture to steaming, and thereafter drying the product. The individual pieces of war noodles produced according to this known method are such that said edible oil is scattered non-uniformly on the surfaces of the individual noodles, and accordingly it is not possible to completely eliminate the mutual sticking between individual cord-like noodles which takes place during the step of steaming. This means that an additional step of releasing the mutually contacting noodles apart from each other is required. Moreover, when the dry noodles are subjected to cooking by immersion in hot water, a sense and feel of wheat flour still remains when eaten. This is caused by the inevitable non-uniform α-conversion during the manufacturing process due to the application of oil-in-water emulsion before steaming, and also caused by insufficient ability for being rendered to the boiled or cooked state within a short period of time. These facts lead to lowering of the sense, feel and taste when the cooked noodles are eaten, which represent lowering of the value as dry noodles which requires improvement.

As a means of solving such problems U.S. Pat. No. 4,098,906 describes a method for manufacturing non-fried dry instant cooking noodles which includes the application of an aqueous emulsion of an edible oil to the surfaces of shaped elongated raw pieces of noodles, and then subjecting these noodles to steaming to prevent mutual sticking of the individual noodles and to accelerate α-conversion of the starch-containing components during a short period of time. Next the moisture contained in the noodles is removed by dehydrating and evaporation in a drying step to expand the surfaces of the noodles to make these surfaces porous and to produce very fine pores communicating with the inner portions or texture of the noodles. The resulting dry noodles can be converted to the boiled or cooked state in a short period of time, and the cooked noodles give satisfactory sense, feel and taste when eaten. This procedure reduces the number of individual noodles sticking to each other. Since, however, an aqueous emulsion of edible oil is applied to the surfaces of the shaped noodles during the course of their manufacture, degradation of the quality of the dry noodles over a period of time cannot be avoided, however, the speed of degradation of noodle quality is improved as compared with that of fried dry noodles.

An additional factor to be considered is that noodle products containing oil cannot be labeled as noodles according to U.S. food labeling requirements, but are commonly termed "oriental noodles" or "oriental-style noodles" in the trade. As such, there has been a demand for the development of technique which satisfies this requirement of long stable durability of quality of the product, resisting a long period of storage.

We have undertaken various studies and many experiments to resolve the foregoing problems encountered in the prior art, and as a result we have discovered and hereby disclose the present invention based on the discovery that, by first forming a mixture of grain flour consisting mainly of wheat flour and water, then rolling this mixture material into a long web of an appropriate thickness containing from 25% to 45% by weight of water, or by forming this mixture and subjecting the same to extrusion under pressure to provide a web of raw noodle material also having from 25% to 45% by weight of water content, thereafter either subjecting the web directly to steaming for α-conversion of the starch-containing components or first applying water to the surfaces of the raw web and then steaming the result web for α-conversion, followed by preliminarily drying the web to regulate the water content to 15-35% by weight, then cutting the web into shaped individual noodles, and lastly drying the final product an improved noodle is produced.

Using such a procedure by steaming the dough in the form of a web rather than slit stands no sticking of the noodles material as encountered. This means that α-conversion can progress uniformly throughout the web and blister-like formations on the surfaces of the web are not developed. After said steaming step the web is subjected to a preliminary drying, so that the web can be cut into individual pieces of noodle without the annoyance of sticking to the cutter blade and without requiring the troublesome step of releasing the entangled pieces of noodles as has been required in the prior art. Our dry noodle product has a uniform width or size and the thus-shaped noodles, when subjected to further drying, produces a rather porous texture which is peculiar to dry noodles intended for instant cooking. These noodles can be quickly rendered to the edible cooked or boiled state by immersion in hot water during a short period of time, giving such satisfactory sense, taste and feel as expected of cooked noodles, and have an outstanding storage stability for an extended length of time.

Briefly stated, to make the noodles of our invention a web of raw noodle material, which contains from 25% to 45% by weight of water, is steamed, preliminarily dried to reduce the water content of the web to 15-35% by weight, and then cut into the desired noodle shape, and dried. Optionally water may be applied to the web prior to steaming depending upon the final product desired.

Our procedure does not require the use of an edible oil applied to the noodle surface, thus many of the difficulties that may be encountered with the procedure of U.S. Pat. No. 4,098,906 can be avoided. Moreover, the product of our invention is oil-free and thus may be properly marketed as a noodle in the United States. Omission of the edible oil to the surfaces of raw noodles eliminates the cause for quality degradation with time; the products of our invention are oil-free and fully storage stable.

SUMMARY OF THE INVENTION

An object of the present invention is to provide non-fried oil-free instant cooking dry noodles free from the disadvantages, inconveniences and problems of the prior art and which eliminate the occurrence of mutual sticking and agglomeration of shaped noodles during the manufacturing process.

Another object of the present invention is to provide dry noodles having smooth surfaces with substantially no blister-like formations thereon.

Still another object of the present invention is to provide dry noodles which can be transformed quickly to the cooked or boiled condition by immersion in hot water, and which give a satisfactory sense, feel and taste when eaten.

A further object of the present invention is to provide noodles that are storage stable for an extended period of time without deterioration of the quality of the product dry noodles.

Characterizing features of the instant cooking non-fried dry noodles of our invention include numerous pores distributed on the surface and into the interior of the products as well as the volume of such pores. We have found that the products of our invention have a significantly greater pore volume per unit weight as compared with conventionally prepared products. Typically the pore volume is in the range of about 0.07 to about 0.40 ml/g, as measured according to the porosity test herein described. This distinctive feature allows for rapid rehydration when the product is immersed in hot water which quickly restores it to the edible state.

In addition to the frequency and size of the pores, noted above, the configuration of these pores plays an important role in the rehydration of the product. The pores in our product tend to arrange themselves to be in communication with one another and extend into the interior portion of the product itself. This configuration also enhances a more rapid restoration of the dry product to the edible state when immersed in hot water.

Conventionally prepared quick-cooking pasta products contain starch in their initial round configuration, however we have observed that, in contrast, the starch particles of our invention appear to be distinctly flattened as shown in the attached photographs. The products of our invention are free from blister-like formations on the surface and this feature is often grossly observable from an inspection of the product itself.

BRIEF DESCRIPTION OF THE DRAWINGS

FIGS. 1, 4, 5, 7 and 9 are of the surface of the various products while remaining FIGS. 2, 3, 6, 8 and 10 are cross-sectional views. FIG. 2 represents a magnification of ×100, FIG. 3 a magnification of ×50, and other Figures a magnification of ×300.

Figure 1:
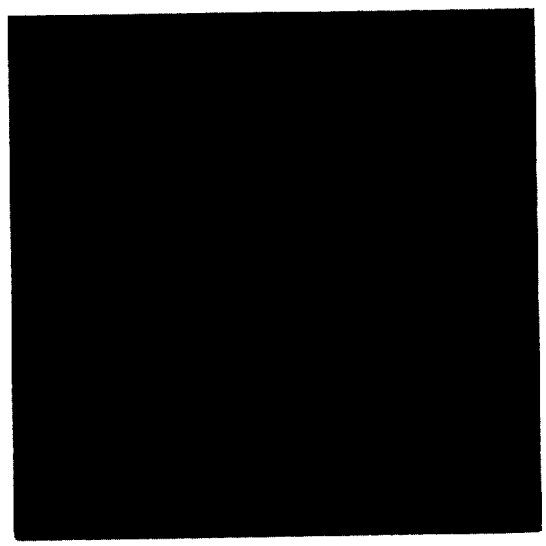
FIGS. 1-10 are electron photomicrographs of the products produced in Examples 11 and 12 and the products of controls 8-11 as prepared in the following examples.

These and other objects, the advantages as well as the features of the present invention will become apparent from the following detailed description.

DETAILED DESCRIPTION OF THE PREFERRED EMBODIMENTS

Illustrative and preferred embodiments of the present invention are described below. For purposes of explanation it will be understood that the term "web of raw noodle material" as used in the present invention is a web made of a starting material of starch components consisting mainly of wheat flour, or is made of these starch components and an appropriate amount of egg yolks and contains from 25% to 45%, preferably from 30% to 40%, by weight of water relative to the weight of the starch-containing components contained in the web. The web is formed either by mixing the components while avoiding as much as possible kneading the components during such mixing, and rolling the mixture (this type of web will hereinafter be referred to as rolled web), or by passing the dough through an extruder while being kneaded therein under pressure (this type of web will hereinafter to be referred to as pressure-extruded web). Regardless of the form of its preparation the web produced usually has a thickness of 2 mm or less. The exact web thickness will depend largely on the thickness of the final product desired.

The raw noodle web may also contain one or more known improving agents for noodles such as di-sodium phosphate, a foodstuff additive such as glycerin monostearate, and a seasoning agent such as "kansui" which is an agent for increasing the viscosity of noodles. Kansui is an extract of banana and Taiwan plantain in the form of an aqueous solution containing potassium carbonate, sodium carbonate, potassium phosphate and sodium phosphate.

The web of noodle material preferably contains, uniformly dispersed therein, sodium chloride in an amount not exceeding 8%, more preferably from 0.5% to 8%, by weight relative to the weight of the starch-containing components before being steamed. Sodium chloride is included for improving the ability of the product dry noodles to transform to the edible boiled or cooked state when immersed in hot water, and to provide the desired taste to the noodles. We have found that if the sodium chloride is present in excess of 8% by weight, the noodles will become too salty and are not good in terms of quality. Also the gluten structure of the noodle material will be severed apart, making it difficult to form a web of noodle material. If the sodium chloride content is less than 0.5% by weight, the product dry noodles may not be transformed satisfactorily to the edible or boiled state, and the noodles may not have the desired taste when eaten. It should be noted, however, that, for noodles having a substantially small thickness, those product noodles having sodium chloride content of zero (0%) are able to transform, within a short period of time, to edible state when immersed in hot water, and such transformed edible noodles give satisfactory feeling and sense when eaten. It will be understood that sodium chloride is an optional ingredient.

We have also found that of the two types of webs the rolled web has a porous texture having finer pores in a greater number as compared with the pressure-extruded web. As a consequent dry noodles made from the rolled web are more quickly rendered to the edible boiled or cooked state when immersed in hot water and give better sense, feel and taste when eaten as compared with dry noodles made from the pressure-extruded web. Thus, the use of rolled web is preferred.

A viscous binder such as egg yolk or gum component as an additive intended for increasing the viscosity of the components contained in the web may be added to the noodle material, and indeed to make food grade and labeled "noodles" egg yolk must be prevent. Egg yolk tends to prevent the occurrence of blister-like bubble-formations in the surfaces of the web during steaming decreases the water content of the web so that these blister-like formations are avoided. It will be understood that the so-called food additives that may be used include di-solidum phosphate; glycerin monostearate; "kansui" to increase the viscosity of noodle; a surface active agent such as glycerin fatty acid ester, sucrose fatty acid ester, sorbitan fatty acid ester and lecithin; a moistening agent such as propylene glycol and D-sorbitol; or other agents including sodium starch phosphate, sodium caseinate, L-lysine hydrochloride, vitamin $B_1$, vitamin $B_2$, chlorella and active gluten. The viscous binder may be egg yolk or a water-soluble gum such as cellulose sodium glycolate, sodium polyacrylate and sodium alginate. As the seasoning agents, various spices, extracts, sodium glutaminate, sodium inosinate, guanylic acid or succinic acid may be used.

If water content of the web is less than 25% by weight relative to the weight of the starch components contained in the web, the distribution of both water and air in the web becomes non-uniform, the viscosity of the components becomes markedly lowered, and the web becomes powdery. In the subsequent steaming stage uniform swelling will not develop as the $\alpha$-conversion of the starch components progresses and a blister-like bubble formation will develop in the surfaces of the web causing the surfaces to lack smoothness. As a result the final dry noodles, when immersed in hot water, will develop scraping and cracking of the body of web, thus reducing the sense, feel and taste of the cooked noodles when eaten. On the other hand, in case the water content of the mixture of raw noodle material exceeds 45% by weight relative to the weight of the starch-containing components contained in the mixture, this mixture will have an increased adhesiveness which causes the mixture to adhere to the surfaces of the rollers, resulting in a failure to obtain a satisfactory web of raw noodle material.

The manufacturing process used to make the products of the present invention will now be described.

First a web of raw noodle material is steamed to cause $\alpha$-conversion of the starch-containing components, or alternatively, water is applied to the surfaces of the web and the web is steamed for causing $\alpha$-conversion of the starch components.

The use of water on the surfaces of the web causes a more uniform progression of $\alpha$-conversion at steaming.

For steaming any conventional steaming conditions may be employed, typically the web is contacted with steam under a gauge pressure of 0.5–1.5 $kg/cm^2$. Steaming is performed until the starch-containing components have an $\alpha$-conversion degree of at least 85%, preferably in excess of 90% and most preferably at least 93%. After this steaming step, the web is subjected to a preliminary drying step during which the water content of the web is regulated to 15–35% by weight, preferably 18–30% by weight.

The moisture content is selected so that the preliminarily dried web may be easily cut and that during steaming the noodle ribbons do not stick to each other thus allowing even and uniform $\alpha$-conversion of the starch-containing component. Proper moisture allows for sufficient expansion and provides a uniform, porous texture to the product. After said preliminary drying step the resulting web is cut into shaped noodles of about 10 mm at most in diameter or width. Web slitting or cutting may be carried out by the use of any known noodle cutter having a straight cutting edge or a wave-shaped cutting edge, or by the use of a slit cutter. Thereafter, the individual noodles are dried and the product dry noodles are obtained.

Using the above-mentioned conditions, by cutting the web of noodle material after the web has been subjected to a preliminary drying step to obtain shaped individual noodles it is possible to provide uniform individual noodles which are free of mutual sticking between the noodles, requiring no subsequent step of releasing the entagled noodles. The noodles thus obtained will exhibit a uniform fine porous texture during the subsequent drying step so that dry noodles for instant cooking which are satisfactorily transformed to the edible boiled or cooked state when immersed in hot water and which are very good in sense, feel and taste when eaten are produced. The finished, dried product usually contains less than 13% by weight of water after the final drying.

Further details concerning the process of making the noodle products is given in our earlier application Ser. No. 1,352 filed Jan. 4, 1979, the disclosure of which is hereby incorporated by reference.

The noodle products of our invention are dried units of dough made from semolina, durum flour, farina, flour, or any combination of two or more of these, with liquid eggs, frozen eggs, dried eggs, egg yolks, frozen yolks, dried yoks, or any combination of two or more of these, with or without water and optionally with a seasoning such as onions, celery, garlic, bay leaf, sodium chloride (salt), gum gluten, concentrated glyceryl monostearate. Among such noodle products there are ribbon-shaped noodle products called egg noodles, cord-shaped egg spaghetti or the smaller egg vermicelli, as described in 21 CFR §139.150 (1978), the provisions of which are hereby incorporated by reference.

It is preferred that the noodle product of our invention contain at least 87% total solids and when egg yolk is included to make egg noodles or the like the total solids contain not less than 5.5% solids of egg or egg yolk.

Our invention also includes flat ribbon-like noodles called "kishimen" and buckwheat noodles called "soba" as dry instant cooking food products.

Some preferred examples of the present invention and comparative examples will now be described with the understanding that in these examples, the term "part" signifies a part by weight and the term "%" means percent by weight. Evaluation of the sense, feel and taste of the cooked noodles, rating of blister-like bubble formations produced in the surfaces of the web of raw material, rating of the degree of inter-noodle sticking, rating of α-conversion, water absorbability, transparency of the hot water after dry noodles are immersed therein, determination of POV (peroxide value), COV (carbonyl value), and (acid value) and pore volume are determined in the manner as stated below.

(1) Evaluation of sense, feel and taste:

Dry noodles (70 g) are placed in a heat-resistant cup, followed by pouring therein hot water (400 ml) at 90° C., and leaving them to stand for 3 minutes. At the end of 3 minutes, the noodles thus cooked are evaluated by a panel of 20 persons. The evaluation points are as follows: 10 (very good); 8 (good); 6 (normal); 4 (poor); and 2 (very poor). These points are shown by the mean values; decimals of over 0.5 inclusive are raised to the next higher number and the rest are ignored. The items relating to the evaluation of the cooked or edible-states noodles when eaten show the number of persons among the 20 person panel who indicate their evaluation after eating the edible-state samples. The external appearance of the dry noodles is evaluated by gross examination and the degree is indicated by these persons of the panel.

(2) Rating of blister-like bubble-formation in the surfaces of web:

Webs of raw noodle material are steamed, and thereafter measured grossly for the number of blister-like bubble-formations of 1 mm or greater in breadth for an area of 10 cm² of the steamed web. The value representing the number is shown.

(3) Rating of the degree of sticking between noodles:

A web is cut into individual raw noodles by a cutter blade having a straight cutting edge. The number of the raw noodles which have developed sticking or agglutination between them per 20 g of specimen noodles consisting of about 200 individual cords is measured and the value indicated.

(4) Degree of α-conversion determined by diastase enzyme process:

Fried instant cooking noodles are degreased with ethyl ether at 50° C. or below and then in excess of 20 g of such noodles are pulverized. For the non-fried, oil-free noodles, more than 20 g of such noodles are directly pulverized. Fine powders having a grain size of less than 100 mesh are used. In the measurement, 5 conical flasks of 100 ml each are used with respect to each sample; these flasks are referred to as $A_1$-$A_4$ and B. 1.00 g of the above described adjusted sample, ±5% is respectively weighed and placed in the $A_1$-$A_4$ flasks, Water (50 ml) is added to each of the five flasks and of these flasks $A_1$ and $A_2$ are heated and boiled for 15 minutes and then quenched to room temperature in ice water.

On the other hand, to each of $A_1$, $A_3$ and B 5 ml of 5% aqueous distase solution is added. All the 5 flasks are kept at 37° C.±1° C. for 90 minutes while shaking in a thermostat-controlled water bath, after which 2 ml of 1 N HCl is added to all the flasks to stop the diastase reaction. The contents of each flask are transferred into a 100 ml messflask respectively and water is added to each till each total volume of the solution in each messflask amounts to 100 ml. Each solution is filtered using a dry filter paper and from the filtrates obtained from the flasks $A_1$-$A_4$ and B, 10 ml of filtrate is pipetted into a conical flask with a ground glass stopped. These filtrates are referred to as $a_1$-$a_4$ and b.

In this stage a conical flask with ground glass stopper containing 10 ml of water taken up by a pipette is prepared separately for a blank tast. 10 ml of N/10 aqueous solution of iodine is added to each of the of 6 flasks.

Then 18 ml of N/10 aqueous solution of sodium hydroxide is added to each of the 6 flasks, one after another, at a same time interval by means of a stopwatch; the flask is corked, shaken and then left to stand precisely for 15 minutes. After the first flask has stood for 15 minutes 2 ml of 10% sulfuric acid is added to the flask in the same order and the same interval as when N/10 aqueous solution of sodium hydroxide was first added, rapidly as soon as the stopper is opened. These solutions are titrated with N/10 aqueous solution of sodium thiosulfate and the titrated values of $a_1$-$a_4$ and b are referred to as $P_1$-$P_4$ and Q; the titrated value of the blank test is referred to as r. α-conversion degree (%) is determined by the following formula:

$$\alpha\text{-conversion degree} = \frac{(r - P_3) - (r - P_4) - (r - Q)}{(r - P_1) - (r - P_2) - (r - Q)} \times 100$$

(5) Water absorbability:

Determination of water absorbability is conducted in accordance with the following procedure.

One liter of water is placed in a 2 liter pan; the water in this pan is raised to boiling; dry samples having a weight $V_D$ in dry state are weighed for 400 g; the dry sample is placed in the pan and the time required for the sample to be transformed to edible boiled state is measured by a stop watch.

At the end of 5 minutes the hot water is removed through a mesh sieve and the residual sample is left to stand for 1 minute to dehydrate the water adhering to the surface of sample. The water-absorbed sample $V_W$ are weighed for 400 g and the water absorbability is calculated by the following formula:

$$\text{water absorbability} = \frac{\text{weight after absorbing water } (V_W) - \text{weight after dehydration } (V_D)}{\text{weight after dehydration } (V_D)}$$

(6) Transparency of cooking water after immersion of noodles:

a 60 g sample for measurement is placed in a 500 ml beaker and hot water (400 ml) is poured in. The transparency of the supernatant liquid skimmed from the resulting water at the end of 3 minutes is measured by a transparency tester.

(7) POV (Peroxide value):

For a sample added with potassium iodide, the isolated free iodine is titrated with a standard solution of sodium thiosulfate, and the milliequivalents of consumed sodium thiosulfate per 1 kg of sample is obtained:

$$POV = \frac{(A - B) \times F}{C} \times 10$$

wherein:
A represents the amount (ml) of N/100 sodium thiosulfate standard solution used in the test;
B represents the amount (ml) of N/100 sodium thiosulfate standard solution used in the blanc test;
F represents the factor of N/100 sodium thiosulfate standard solution; and
C represents the amount (g) of sample used.

(8) COV (carbonyl value):

The sample is dissolved in benzene, then, the resulting solution is reacted against a solution of 4-DNPH in benzene and against a solution of trichloroacetic acid in benzene. A solution of potassium hydroxide in alcohol is added for color development. Light-absorbancy at this time is measured:

$$COV = \frac{Q}{0.854 \times W} \times 1000$$

wherein:
Q represents light-absorbancy; and
W represents the amount (mg) of oil collected from sample.

(9) AV (acid value):

The amount (mg) of potassium hydroxide required for neutralizing free fatty acid contained in sample is calculated by the equation:

$$AV = \frac{5.611 \times A \times F}{B}$$

wherein:
A represents the amount (ml) of the standard solution of N/10 alcoholic potassium hydroxide;
F represents the factor of the standard solution of N/10 alcoholic potassium hydroxide; and
B represents the amount (g) of sample used.

(10) Pore volume:

Measurement of pore volume was made by forcing mercury under pressure into the spaces and voids of a sample, the volume of the mercury so introduced determined and the volume is divided by the weight of the sample. For these measurements a Porosimeter from American Instrument Company is used. The sample is placed in a cell, the pressure reduced first to $5 \times 10^{-2}$ mmHg, then mercury is introduced into the cell to cover the surfaces of the sample. The resulting mercury in the cell is subjected to progressively increased pressure up to 15,000 psi (absolute pressure) to cause penetration of mercury into the texture of the sample, and the volume of mercury (in cc or ml) which has been forced into the pores of the sample from the time it was under an absolute pressure of 11 psi till this pressure was increased to 15,000 psi is measured and divided by the weight of the sample. Pore volume, expressed in ml/g, is thus obtained. A typical sample weights about 2 grams.

EXAMPLE 1

To 500 parts of wheat flour was added a mixed solution of 175 parts of water, 10 parts of sodium chloride and 1 part of "kansui" composition. After stirring the mixture for sufficient mixing without causing any kneading, the resulting mixture was rolled into a sheet 1.2 mm thickness by rollers giving a web of raw noodle material. This web (686 parts) was uniformly sprayed with water from a spray gun, to cause water to be carried on the surfaces of this web in an amount 30% relative to the original weight of the web. The resulting web was steamed at a gauge pressure of 1.0 kg/cm² for 2 minutes, followed by preliminary drying for 3 minutes by heated air at 90° C. which was passed at the speed of 15 m/sec, thereby adjusting the water content of the web to 25%. Thereafter, the web was cut with a No. 20 cutter having a straight cutting edge into individual raw noodles of 1.5 mm in width. These noodles were further dried by hot air at a temperature of 100° C. with an air speed of 20 m/sec until the water content of these noodles became 7% thus producing the instant cooking dry noodles of the present invention.

EXAMPLE 2

The procedure similar to Example 1 was carried out to obtain instant cooking dry noodles of the present invention except that no water was applied to the surfaces of the web of raw noodle material.

EXAMPLE 3

The procedure similar to Example 1 was carried out to obtain instant cooking dry noodles of the present invention except that the web was prepared by the use of a pressure-extruder rather than rollers.

EXAMPLE 4

The procedure similar to Example 2 was carried out to obtain instant cooking dry noodles except that the web was prepared by the use of a pressure-extruder.

Control 1

In the procedure of Example 1, the steaming step was omitted, and thus instant cooking dry noodles were obtained.

CONTROL 2

In the procedure of Example 1, the preliminary drying step was omitted, to obtain instant cooking dry noodles.

Control 3

The web of Example 1 was used. This web was cut into individual raw noodles of 1.5 mm in width with a No. 20 cutter having a wave-like cutting edge. Thereafter, these noodles were steamed for 2 minutes at a gauge pressure of 1.0 kg/cm², followed by drying the steamed noodles by hot air at 100° C. at an air speed of 20 m/sec until the water content of the noodles became 7%, and thus instant cooking dry noodles were obtained.

Control 4

The procedure similar to Control 3 was carried out to obtain instant cooking dry noodles except that the web of raw noodles material of Example 3 was used.

Control 5

The procedure similar to Control 3 was carried out except a daugh having the same composition as that of the web of Example 1 was directly extruded through a die to obtain straight, cord shaped raw noodles of 1.5 mm in width and 1.2 mm in thickness having a rectangular cross section.

Control 6

The procedure similar to Control 3 was followed to obtain instant cooking dry noodles except a web of raw noodle material of 1.2 mm in thickness was prepared by mixing 500 parts of wheat flour with 1 part of solution of the "kansui" composition, 10 parts of sodium chloride, 175 parts of water and 83 parts of aqueous emulsion of an edible oil consisting of 900 parts of water, 100 parts of salad oil and 2 parts of an ester of saccharose and palmitinic acid, and then molded by rollers.

The instant cooking dry noodles obtained in Examples 1–4 and Controls 1–6 were each evaluated for the sense, feel and taste of the transformed (cooked) noodles when eaten, the degree of blister-like bubble-formations in the surfaces of the webs of raw noodles material was determined, and of the degree of sticking between individual noodles was noted. The results of these observations and measurements are shown in Table 1.

TABLE 1

|  | Examples |  |  |  | Controls |  |  |  |  |  |
|---|---|---|---|---|---|---|---|---|---|---|
|  | 1 | 2 | 3 | 4 | 1 | 2 | 3 | 4 | 5 | 6 |
| No. of blister-like formations (No. of persons) | 0 | 0 | 0 | 0 | 0 | 0 | 0 | 0 | 0 | 0 |
| No. of mutually sticking noodles: |  |  |  |  |  |  |  |  |  |  |
| 2 | 0 | 0 | 0 | 0 | 0 | 14 | 22 | 21 | 18 | 8 |
| 4 | 0 | 0 | 0 | 0 | 0 | 8 | 14 | 8 | 14 | 4 |
| over 6 | 0 | 0 | 0 | 0 | 0 | 5 | 9 | 11 | 12 | 5 |
| Appearance of noodles (how well molded) (No. of persons) | G | G | G | G | SP | P | P | P | P | SP |

TABLE 1-continued

|  | Examples |  |  |  | Controls |  |  |  |  |  |
|---|---|---|---|---|---|---|---|---|---|---|
|  | 1 | 2 | 3 | 4 | 1 | 2 | 3 | 4 | 5 | 6 |
| Stick to teeth (No. of persons) | 0 | 0 | 1 | 1 | 18 | 6 | 3 | 10 | 10 | 1 |
| Short of resiliency (No. of persons) | 0 | 1 | 0 | 0 | 16 | 11 | 8 | 0 | 0 | 13 |
| Excessive resiliency | 0 | 0 | 1 | 3 | 0 | 0 | 0 | 12 | 14 | 0 |
| Short of smoothness (No. of persons) | 0 | 0 | 0 | 0 | 14 | 5 | 10 | 0 | 0 | 9 |
| Excessively smooth (No. of persons) | 0 | 0 | 0 | 1 | 0 | 0 | 0 | 0 | 1 | 0 |
| Feel like raw wheat flour (No. of persons) | 0 | 0 | 0 | 0 | 20 | 9 | 3 | 6 | 8 | 11 |
| Evaluation when eaten (points) | 10 | 9 | 9 | 8 | 2 | 4 | 4 | 3 | 2 | 3 |

Note:
G represents Good.
SP represents Slightly Poor.
P represents Poor.

As will be clear from the result shown above, the products of the present invention obtained in Examples 1–4 were found to be superior to Controls 1–6 with respect to the degree of sticking between noodles, the ability of dry noodles to be transformed to the cooked state when immersed in hot water, and the sense, feel and taste of the cooked noodles when eaten.

Control 7

The same web of raw noodle material as that of Example 1 was shaped and cut into individual raw noodles of 1.5 mm in width by a No. 20 straight cutter. To these raw noodles (686 parts) was uniformly sprayed by a spray gun a solution of emulsion consisting of 900 parts of water, 100 parts of salad oil and 2 parts of ester of saccharose and a high molucular fatty acid. The amount of this emulsion adhering to the surfaces of the raw noodles was 30%. Based on the absolute weight of the noodles, 2.1% of salad oil, 20.8% of water, and 0.04% of the saccharose ester and palmitinic acid serving as the emulsion adhered to the surfaces. Thereafter, the resulting raw noodles were steamed for 2 minutes at a gauge pressure of 1.0 kg/cm², and then the steamed noodles were dried by hot air at 100° C. at an air speed of 20 m/sec until the water content of the raw noodles became 7%. Thus, porous instant cooking dry noodles having fine pores therein were obtained.

Next, the quality of the products of Examples 1–2 (the present invention) and of Control 7 were evaluated at the time immediately after manufacture and at the end of one year. The result of evaluation is shown in Table 2.

TABLE 2

| Cooked noodles | Example 1 | | Example 2 | | Control 7 | |
|---|---|---|---|---|---|---|
|  | Immediately after production | At end of one year | Immediately after production | At end of one year | Immediately after production | At end of one year |
| Excessively smooth (No. of persons) | 0 | 0 | 0 | 0 | 1 | 1 |
| Short of smoothness (No. of persons) | 0 | 1 | 0 | 0 | 0 | 0 |
| Cut well by teeth (No. of persons) | 0 | 0 | 0 | 0 | 0 | 0 |
| Cut poorly by teeth (No. of persons) | 0 | 0 | 0 | 0 | 0 | 1 |
| Feel like raw wheat flour (No. of persons) | 0 | 0 | 1 | 2 | 0 | 0 |
| Oily odor (No. of persons) | 0 | 0 | 0 | 0 | 0 | 3 |

TABLE 2-continued

|  | Example 1 | | Example 2 | | Control 7 | |
| --- | --- | --- | --- | --- | --- | --- |
| Cooked noodles | Immediately after production | At end of one year | Immediately after production | At end of one year | Immediately after production | At end of one year |
| Evaluation when eaten (point) | 10 | 9 | 9 | 9 | 9 | 8 |
| α-conversion degree (%) | 97 | 96 | 94 | 93 | 96 | 95 |
| Water absorbability (%) | 128 | 123 | 120 | 118 | 118 | 111 |
| Amount of edible oil (%) | 0 | 0 | 0 | 0 | 0.78 | 0.78 |
| Amount of emulsion (%) | 0 | 0 | 0 | 0 | 0.03 | 0.03 |
| Transparency thru hot water after immersion (cm) | 6.5 | 6.5 | 6.5 | 6.5 | 2.0 | 2.0 |
| POV | 4.1 | 9.2 | 4.0 | 9.2 | 11.2 | 55.8 |
| COV | 6.3 | 9.9 | 6.4 | 9.8 | 18.2 | 41.4 |
| AV | 0.3 | 0.5 | 0.3 | 0.5 | 0.9 | 2.1 |
| Overall evaluation (points) | 10 | 9 | 9 | 8 | 8 | 7 |

As will be apparent from the result shown above, Examples 1-2 according to the present invention were found to be superior to Control 7, non-fried instant cooking dry noodles obtained by spraying an aqueous emulsion of edible oil onto the surfaces of raw noodles, with respect to POV, COV and AV which are indices of degradation of quality, and the durability in storage for an extended period of time.

EXAMPLE 5

The procedure similar to Example 1 was carried out except that the water content of the web of raw noodle material was changed to the value shown in Table 3. The result of evaluation of the product is shown in Table 3.

TABLE 3

|  | Water content of raw web (%) | | | | |
| --- | --- | --- | --- | --- | --- |
|  | 25 | 30 | 33 | 40 | 45 |
| No. of blister-like formations in surfaces of web | 84 | 0 | 0 | 0 | 0 |
| No. of mutually sticking noodles: |  |  |  |  |  |
| 2 | 0 | 0 | 0 | 0 | 0 |
| 4 | 0 | 0 | 0 | 0 | 0 |
| over 6 | 0 | 0 | 0 | 0 | 0 |
| Appearance of noodles (how well molded) | P | G | G | G | G |
| Stick to teeth (No. of persons) | 13 | 0 | 0 | 0 | 0 |
| Short of resiliency (No. of persons) | 13 | 0 | 0 | 0 | 0 |
| Excessive resiliency (No. of persons) | 2 | 2 | 0 | 0 | 0 |
| Short of smoothness (No. of persons) | 18 | 4 | 0 | 0 | 0 |
| Excessively smooth (No. of persons) | 0 | 0 | 0 | 1 | 2 |
| Feel like raw wheat flour (No. of persons) | 16 | 0 | 0 | 0 | 0 |
| Evaluation when eaten (points) | 3 | 8 | 10 | 9 | 9 |

Note:
G represents Good.
P represents Poor.

EXAMPLE 6

The procedure similar to Example 1 was carried out except that the starting mixture of Example 1 further contains 25 parts of egg yolk and that the water content of the web of raw noodle material is changed to that shown in Table 4. The result of evaluation of this Example is shown in Table 4.

TABLE 4

|  | Water content of raw web (%) | | | | |
| --- | --- | --- | --- | --- | --- |
|  | 20 | 23 | 25 | 30 | 45 |
| No. of blister-like formations in surfaces of raw web | 49 | 18 | 0 | 0 | 0 |
| No. of mutually sticking noodles: |  |  |  |  |  |
| 2 | 0 | 0 | 0 | 0 | 0 |
| 4 | 0 | 0 | 0 | 0 | 0 |
| over 6 | 0 | 0 | 0 | 0 | 0 |
| Appearance of noodles (how well molded) | P | G | G | G | G |
| Stick to teeth (No. of persons) | 13 | 10 | 0 | 0 | 0 |
| Short of resiliency (No. of persons) | 11 | 8 | 0 | 0 | 0 |
| Excessive resiliency (No. of persons) | 1 | 0 | 2 | 0 | 0 |
| Short of smoothness (No. of persons) | 18 | 6 | 2 | 1 | 0 |
| Excessively smooth (No. of persons) | 0 | 0 | 0 | 0 | 1 |
| Feel like raw wheat (No. of persons) | 18 | 10 | 0 | 0 | 0 |
| Evaluation when eaten (points) | 3 | 5 | 8 | 9 | 9 |

Note:
G represents Good.
P represents Poor.

From the result shown above, it will be appearent that, even when the water content of web of raw noodles material was lowered to 25%, a desirable result was still obtained.

EXAMPLE 7

The procedure similar to Example 1 was carried out except that the water content of the web after preliminary drying was adjusted as shown in Table 5 by changing the length of time of the preliminary drying step. The result is shown in Table 5.

TABLE 5

|  | Water content after preliminary drying (%) | | | | | |
| --- | --- | --- | --- | --- | --- | --- |
|  | 5 | 10 | 15 | 25 | 30 | 40 |
| No. of blister-like formations in |  |  |  |  |  |  |

TABLE 5-continued

|  | Water content after preliminary drying (%) | | | | | |
| --- | --- | --- | --- | --- | --- | --- |
|  | 5 | 10 | 15 | 25 | 30 | 40 |
| surfaces | 0 | 0 | 0 | 0 | 0 | 0 |
| No. of mutually sticking noodles: | | | | | | |
| 2 | 0 | 0 | 0 | 0 | 0 | 21 |
| 4 | 0 | 0 | 0 | 0 | 0 | 10 |
| over 6 | 0 | 0 | 0 | 0 | 0 | 8 |
| Appearance of noodles (how well molded) | P | P | G | G | G | P |
| Stick to teeth (No. of persons) | 0 | 0 | 0 | 0 | 0 | 9 |
| Short of resiliency (No. of persons) | 2 | 0 | 0 | 0 | 0 | 0 |
| Excessive resiliency (No. of persons) | 10 | 7 | 10 | 0 | 1 | 6 |
| Short of smoothness (No. of persons) | 6 | 3 | 0 | 0 | 0 | 0 |
| Excessively smooth (No. of persons) | 0 | 0 | 0 | 0 | 3 | 10 |
| Feel like raw wheat flour (No. of persons) | 0 | 0 | 0 | 0 | 0 | 0 |
| Evaluation when eaten (points) | 2 | 4 | 9 | 10 | 8 | 4 |

Note:
G represents Good.
P represents Poor.

The result shows that the water content of the web after preliminary drying is required to be adjusted to 15 to 35% by weight, preferably 18 to 30% by weight.

EXAMPLE 8

The procedure similar to Example 1 was carried out to obtain instant cooking dry noodles excepting that the sodium chloride content of the raw web of noodle material was varied as shown in Table 6.

TABLE 6

|  | Sodium Chloride content of raw web of noodle material | | | | |
| --- | --- | --- | --- | --- | --- |
|  | 0% | 0.5% | 4% | 8% | 10% |
| Appearance of noodles (how well molded) | G | G | G | G | P |
| Short of smoothness (No. of persons) | 1 | 0 | 0 | 0 | 0 |
| Excessively smooth (No. of persons) | 0 | 0 | 0 | 0 | 8 |
| Stick to teeth (No. of persons) | 1 | 0 | 0 | 0 | 0 |
| Cut well by teeth (No. of persons) | 0 | 0 | 0 | 0 | 6 |
| Cut poorly by teeth (No. of persons) | 3 | 2 | 0 | 0 | 0 |
| Short of resiliency (No. of persons) | 1 | 0 | 0 | 0 | 0 |
| Excessive resiliency (No. of persons) | 0 | 0 | 0 | 0 | 4 |
| Feel like raw wheat flour (No. of persons) | 3 | 2 | 0 | 0 | 1 |
| Salty taste sensed (No. of persons) | 0 | 0 | 0 | 3 | 16 |
| Water absorbability (%) | 118 | 122 | 129 | 132 | 135 |
| Evaluation when eaten (points) | 8 | 9 | 10 | 9 | 2 |

Notes:
G represents Good.
P represents Poor.
2.0% content is mentioned in Example 1.

As will be clear from the above-mentioned result, the sodium chloride content of raw web of noodle material is preferably in the range of 0.5%–8.0% by weight.

EXAMPLE 9

The procedure similar to Example 1 was carried out to obtain instant cooking dry noodles of the present invention excepting that the sodium chloride content of the raw was of noodle material web set at 0% and that the thickness of this web was varied as shown in Table 7.

TABLE 7

|  | Thickness of Raw Web | | | |
| --- | --- | --- | --- | --- |
|  | 0.3mm | 0.6mm | 0.9mm | 1.2mm |
| Appearance of noodles (how well molded) | G | G | G | G |
| Short of smoothness (No. of persons) | 0 | 0 | 0 | 1 |
| Excessively smooth (No. of persons) | 0 | 0 | 0 | 0 |
| Stick to teeth (No. of persons) | 0 | 0 | 0 | 1 |
| Cut well by teeth (No. of persons) | 1 | 0 | 0 | 0 |
| Cut poorly by teeth (No. of persons) | 0 | 0 | 0 | 3 |
| Short of resiliency (No. of persons) | 1 | 0 | 0 | 1 |
| Excessive resiliency (No. of persons) | 0 | 0 | 0 | 0 |
| Feel like raw wheat flour (No. of persons) | 0 | 0 | 0 | 3 |
| Water absorbability (%) | 134 | 128 | 123 | 118 |
| Evaluation when eaten (points) | 10 | 10 | 10 | 8 |

Notes:
G represents Good.
P represents Poor.
1.2mm thickness corresponds to Example 8 (sodium chloride 0%).

As will be apparent from the result shown above, it is noted that, in case the sodium chloride content is 0%, the smaller the thickness of the raw web of noodle material is, the better feeling is obtained when eaten.

EXAMPLE 10

The procedure similar to Example 1 was carried out to obtain instant cooking dry noodles excepting that the steaming time was varied, that the final drying temperature was set at 130° C. and that the α-conversion degree of the noodles after the final drying was varied as shown in Table 8.

TABLE 8

| α-conversion degree of final product (%) | 81 | 85 | 90 |
| --- | --- | --- | --- |
| Steaming time (sec.) | 50 | 70 | 90 |
| Appearance of noodles (how well molded) | good | good | good |
| Short of smoothness (No. of persons) | 2 | 1 | 0 |
| Excessively smooth (No. of persons) | 0 | 0 | 1 |
| Stick to teeth (No. of persons) | 4 | 0 | 0 |
| Cut well by teeth (No. of persons) | 0 | 0 | 1 |
| Cut poorly by teeth (No. of persons) | 3 | 0 | 0 |
| Short of resiliency (No. of persons) | 3 | 1 | 0 |
| Excessive resiliency (No. of persons) | 0 | 0 | 0 |
| Feel like raw wheat flour (No. of persons) | 12 | 1 | 0 |
| Evaluation when eaten | | | |

TABLE 8-continued

| (points) | 5 | 8 | 9 |
| --- | --- | --- | --- |

As is clear from the above-mentioned result, the α-conversion degree of the noodles after the final drying requires to be 85% or more, preferably 90% or more.

EXAMPLES 11 AND 12 AND CONTROLS 8-13

In order to more fully elaborate and characterize the non-fried pasta products of our invention as well as to compare the same with various prior patents a series of experiments were conducted as explained below. In these experiments Examples 11 and 12 are in accord with the present invention. On the basis of our studies comparisons were made and conclusions drawn evidencing the chemical, physically measurable, optically observable and sensory differences as between the products of our invention and those of prior procedures. These experiments are explained below on the basis of various tables, charts and appended electron photomicrographs.

The following patent documents were used for purposes of comparison: Control 10 is based upon U.S. Pat. No. 3,718,480 to Tremblay in accord with processing conditions stated in the specification of that patent; Control 11 follows Example 2 of U.S. Pat. No. 3,846,563 to Cunningham; Control 12 tracks the conditions stated in U.S. Pat. No. 2,037,042; and Control 13 follows Example A of U.S. Pat. No. 2,677,613.

Examples 11 and 12, in which noodles and spaghetti were prepared, are according to the present invention while Controls 8 and 9 are variations of Example 11 (and thus not according to the invention) in which, respectively, excessive kneading was conducted and the steaming step was omitted.

The compositions of the starting materials used in the various examples and controls are as follows, all in parts by weight totalling 100 parts:

| Example 11 | wheat flour | 70.9 |
| --- | --- | --- |
|  | egg yolk powder | 4.3 |
|  | salt | 2.1 |
|  | water | 22.7 |
| Example 12 | wheat flour | 74.1 |
|  | salt | 2.2 |
|  | water | 23.7 |

Controls 8 and 9 used the same recipe as Example 11.

| Control 10 | wheat flour (durum) | 36.9 |
| --- | --- | --- |
|  | wheat flour (Suisha) | 36.9 |
|  | egg yold powder | 4.1 |
|  | water | 22.1 |
| Control 11 | α-converted wheat flour | 46.8 |
|  | wheat flour (durum) | 11.7 |
|  | egg yolk powder | 3.2 |
|  | salt | 3.2 |
|  | water | 35.1 |
| Control 12 | potato starch | 45.4 |
|  | raw yet yolk | 54.6 |

The type of product produced in each experiment, the primary starch component type and manufacturing workability observation are all reported in Table 9. Physical, chemical and optical results are reported in Table 10.

TABLE 9

|  | Example 11 | Example 12 | Control 8 | Control 9 | Control 10 | Control 11 | Control 12 | Control 13 |
| --- | --- | --- | --- | --- | --- | --- | --- | --- |
| Type of Product | Noodle | Spaghetti | Noodle | Noodle | Noodle | Noodle | Noodle | Noodle |
| Main starting material other than water | Wheat flour | Wheat flour | Wheat flour | Wheat flour | Wheat flour | Gelatinized Wheat flour | Potato starch | Wheat flour |
| Workability during manufacture | Good | Fair | Fair | Fair | Fair | Poor | Impossible | Impossible |

TABLE 10

|  | Example 11 | Example 12 | Control 8 | Control 9 | Control 10 | Control 11 |
| --- | --- | --- | --- | --- | --- | --- |
| α-conversion (%) | 93.8 | 91.3 | 95.0 | 36.2 | 35.1 | 86.3 |
| Pore volume (ml/g) | 0.078 | 0.36 | 0.012 | 0.059 | 0.033 | 0.041 |
| Pore configuration | Many pores which communicate with each other (FIGS. 1,2) | Very many large and small pores which communicate with each other (FIG. 3) | Only a few pores, not interconnected (FIG. 4) | Few pores, not interconnected (FIGS. 5,6) | Same as Control 9 (FIGS. 7,8) | Same as Control 9 (FIGS. 9,10) |
| Residual starch particles | Surface photo shows flattened many starch particles | Flattened starch particles are noted | No starch particles are noted | Starch particles having initial configurations are noted; they are not flattened | Many starch particles having initial configurations are noted; they are not flattened | Same as Control 9 |
| Appearance of noodles (how well molded) | G | G | G | G | G | P |
| Stick to teeth (No. of persons) | 0 | 1 | 2 | 20 | 13 | 16 |
| Short of resiliency (No. of persons) | 0 | 0 | 0 | 20 | 8 | 7 |
| Excessive resiliency (No. of persons) | 0 | 0 | 3 | 0 | 0 | 0 |
| Short of smoothness |  |  |  |  |  |  |

TABLE 10-continued

|  | Example 11 | Example 12 | Control 8 | Control 9 | Control 10 | Control 11 |
|---|---|---|---|---|---|---|
| (No. of persons) | 0 | 1 | 1 | 20 | 15 | 11 |
| Excessively smooth (No. of persons) | 0 | 0 | 0 | 0 | 0 | 0 |
| Feel like raw wheat flour (No. of persons) | 0 | 0 | 2 | 20 | 18 | 13 |
| Strange odor (No. of persons) | 0 | 0 | 0 | 3 | 3 | 1 |
| Evaluation when eaten (points) | 10 | 9 | 7 | 1 | 2 | 3 |

Note:
G represents Good.
P represents Poor.

For convenience the processing conditions and operational parameters are set forth in Table 11, below, reference being made to the previous Examples 1–10 in respect to the present invention and the four U.S. Patents referred to above regarding Controls 10–13.

TABLE 11

|  | Example 11 | | Example 12 | | Control 8 | | Control 9 | |
|---|---|---|---|---|---|---|---|---|
| Mfg. conditions | Mixing ↓ | Main mixing 10 min. | Mixing ↓ | Main mixing 10 min. | Mixing ↓ | Powder: 5 min. for 8 min. | Mixing ↓ | Main mixing 10 min. |
|  | Rolling ↓ | web thickness: 0.6mm | Rolling ↓ | web thickness: 1.2mm | Kneading ↓ | | ↓ | |
|  | Water spray ↓ | Rate: 30% | Water spray ↓ | Rate: 30% | Extrusion ↓ | Nozzle: 10L × 0.5W mm | Rolling ↓ | web thickness 0.6 mm |
|  | Steaming ↓ | Pressure: 1.0 kg/cm² for 2 min. | Steaming ↓ | Pressure: 1.0 kg/cm² for 2 min. | Water spray ↓ | Rate: 30% | ↓ | |
|  | Prelim. drying ↓ | Air temp: 90° C. Air speed: 15 m/sec for 3 min. | Prelim. drying ↓ | Air temp: 90° C. Air speed: 15 m/sec for 3 min. | Steaming ↓ | Pressure 1.0 kg/cm² for 2 min. | ↓ | |
|  | ↓ | | ↓ | | Prelim. drying ↓ | Air temp: 90° C. Air speed: 15 m/sec for 3 min. | ↓ | |
|  | Slit cutting ↓ | Blade No. 4 | Slit cutting ↓ | Blade No. 16 | Slit cutting ↓ | Blade No. 4 | Slit cutting ↓ | Blade No. 4 |
|  | Drying ↓ | Air temp: 100° C. Air speed: 20 m/sec for 7 min. | Microwave drying ↓ | Freq. 2450 MHz Load: 300 g/lot for 8 min. | Drying ↓ | Air temp: 100° C. Air speed: 20 m/sec for 7 min. | Drying ↓ | Air temp: 100° C. Air speed: 20 m/sec for 5 min. |
|  | Cutting to rated length | Length: 40mm | Cutting to rated length | Length: 40mm | Cutting to rated length | Length: 40mm | Cutting to rated length | Length: 40mm |

|  | Control 10 | | Control 11 | | Control 12 | | Control 13 | |
|---|---|---|---|---|---|---|---|---|
| Mfg. conditions | Mixing ↓ | for 10 min. | Mixing ↓ | for 15 min. | Mixing ↓ | for 15 min. | Mixing ↓ | Powder: 5 sec. Maining mixing 5 min. |
|  | Extrusion ↓ | Nozzle: 10L × 0.5W mm | Extrusion ↓ | Nozzle: 150L × 1.0W mm | Extrusion | Immpossible | Maturing ↓ | Room temp: 35° C. Moisture: 70% for 2 hrs. |
|  | Cutting ↓ | Length: 40mm | Superimposing ↓ | 2 piles of web | | | | |
|  | Prelim. drying ↓ | Air temp: 60° C. Air speed: 3 m/sec for 1'45" | Rolling ↓ | Web thickness: 0.7mm | | | Dusting ↓ | 20% (160%) |
|  | ↓ | | Cutting ↓ | Blade No. 4 Length: 40mm | | | Extrusion | Impossible |
|  | Microwave drying | Freq. 2450 MHz Load: 630 g/lot for 8'35" | Drying | Air temp: 116° C. Air speed 6 m/sec for 15 min. | | | | |
| Remarks | | | Due to high rate of addition of water during | | (no product) High viscosity of dough after mixing | | (No product) High water content of dough after maturing | |

TABLE 11-continued

| mixing, marked mutual sticking of product caused difficult manufacture | made extrusion and rolling impossible. | made extrusion impossible, even with dusting of 120%. |

Figure 2:
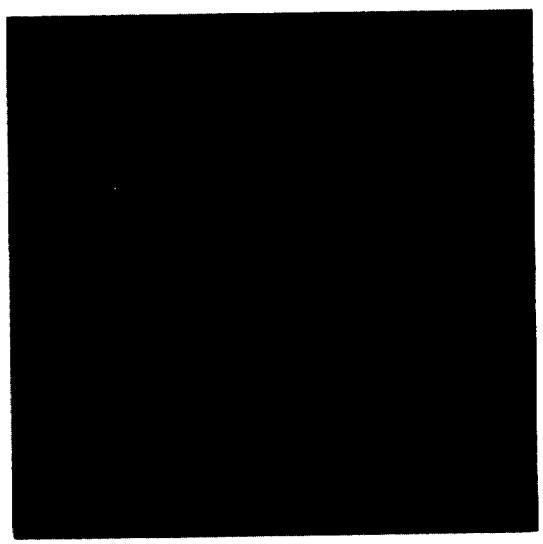
Figure 3:
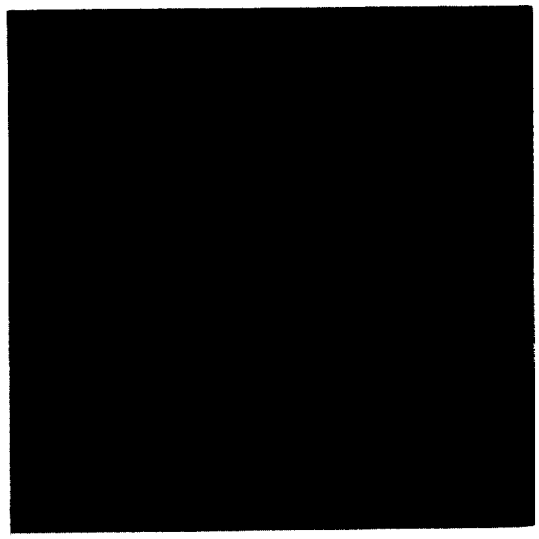

Each of the products produced and observed, as reported above except for Controls 12 and 13, was grossly observed and an electrophotomicrograph was made. These photos are FIGS. 1-10 of this application; FIG. 2 shows a picture enlarged 100 times; FIG. 3 is one enlarged 50 times; and others represent pictures enlarged 300 times.

FIG. 1 is the photograph of the surface of the noodle shaped product of Example 11 in which numerous small pores are noted randomly distributed over the surface of the product; several larger flattened starch particles are also apparent. FIG. 2 is a cross-section of the noodle of Example 11 showing several pores communicating with each other.

FIG. 3 is a cross-section of spaghetti according to Example 12 showing a very large number of pores, including several pores of relatively substantial size.

Figure 4:
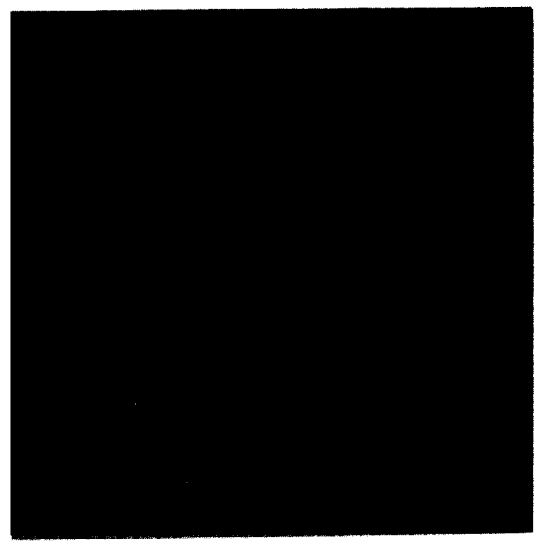

FIG. 4 is a photo of the surface of the noodle product of Control 8, a variation of Example 11 in which the dough was excessively kneaded, showing only a few isolated pores.

Figure 5:
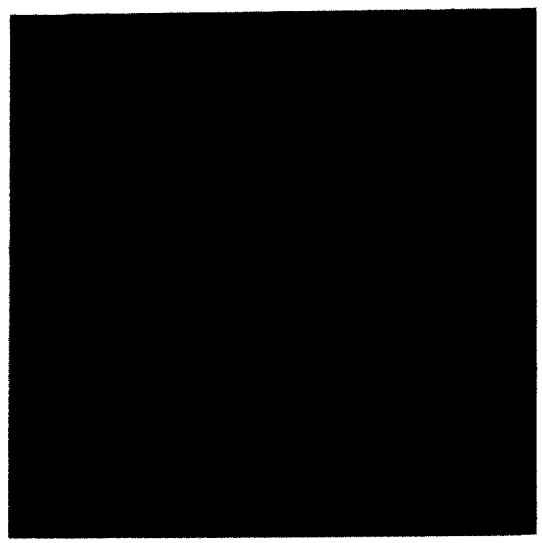
Figure 6:
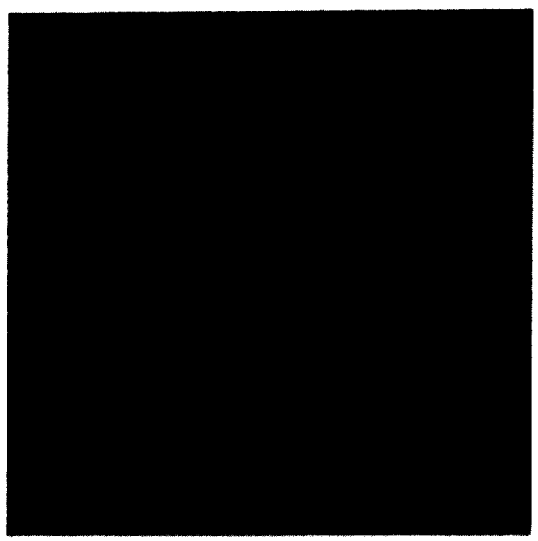

FIG. 5 is a photograph of the surface of product of Control 9, a variation in Example 11 but without steaming, showing intact, unflattened starch particles. FIG. 6 is a cross-section of the same piece showing a few pores, not interconnected, and a few starch particles.

Figure 7:
Figure 8:
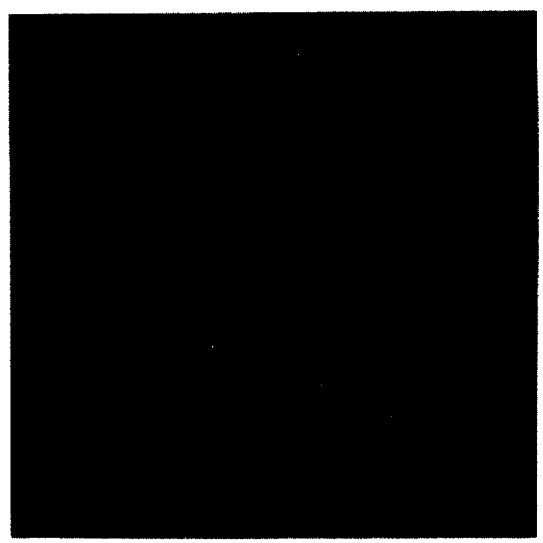

FIG. 7 is the photograph of the surface of the product of Control 10 showing only a few pores and several starch particles that were not flattened during processing. The cross-sectional view of this product in FIG. 8, taken with the surface view, illustrates that the pores are not interconnected.

Figure 9:
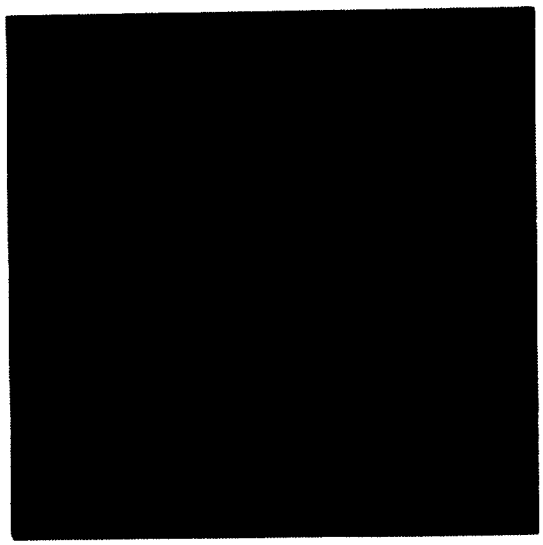
Figure 10:
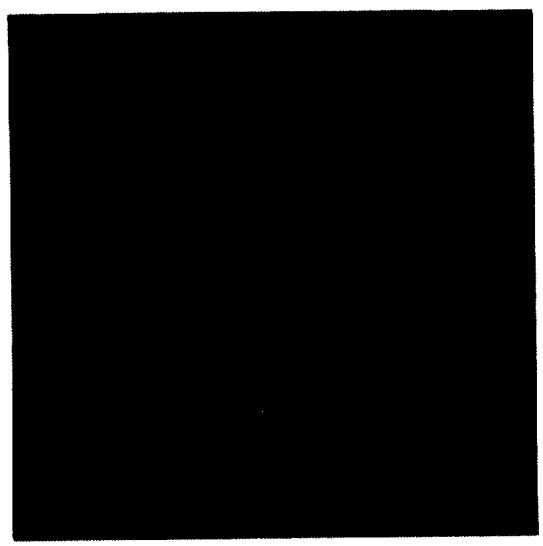

FIG. 9 shows the surface of Control 11 is devoid of pores but does contain several non-flattened starch particles as are shown in the cross-sectional view of FIG. 10 in which a few pores can be seen as well.

As stated above, first a web of raw noodle material is prepared containing from 25% to 45% by weight of water. With or without extra water applied to the surfaces of this web, the entire web is steamed, so that individual noodles entanglement as encountered in the prior art in which the raw web is cut into noodles is avoided. The steamed web is subjected to preliminary drying to adjust the water content to 15-35% by weight, and then the web is shaped into individual noodles, and thus mutual sticking of noodles is avoided. These noodles are further dried to provide the final product having a water content of 13% or less by weight. The resulting dry noodles contain no mutually sticking portions and no blister-like bubble-formations on their surfaces. When immersed in hot water, the dry noodles are easily transformed into the edible cooked or boiled state within a short period of time, and give good feel, sense and taste to the person eating them. Additively, these dry noodles remain stable for long-term storage.

What is claimed is:

1. A non-fried, oil-free instant cooking dry noodle product capable of transformation into an edible cooked or boiled state within a short period of time when immersed in hot water and consisting of a starch-containing component comprised mainly of wheat or grain flour, said noodle product characterized by:

an average pore volume in the range of about 0.07 to about 0.40 ml/g;

the starch contained in the starch-containing component having an α-conversion degree of at least 85%, as measured by the diastase enzyme process;

a fine porous texture providing communication between the external surfaces of the noodles product with the internal portions thereof by a network of fine pores;

smooth, non-coated surfaces devoid of bubble-like formations;

devoid of portions of the dry noodle product sticking to adjacent portions;

storage stable for at least one year without substantial change in product quality; said noodle product yielding a non-sticking good sense, feel and taste when transformed into the edible coated state.

2. The non-fried, oil-free instant dry noodle product of claim 1 wherein the degree of α-conversion is at least about 93%.

3. The non-fried, oil-free instant dry noodle according to claim 1 or 2 also containing egg yolk, dried egg yolk, frozen egg yolk or mixtures thereof.

4. The non-fried oil-free instant dry noodle product of claim 1 or 2 also containing from about 0.5 up to about 8% sodium chloride relative to the weight of the starch-containing component.

5. The non-fried, oil-free instant dry noodle product of claim 1 or 2 containing from about 0.5 up to about 8% by weight of sodium chloride relative to the weight of the starch-containing component together with egg yolk, dried egg yolk, frozen egg yolk or mixture thereof.

6. The non-fried, oil-free instant dry noodle product of claim 1 or 5 further including a seasoning, gum gluten, concentration glyceryl monostearate or mixtures thereof.

7. Non-fried, oil-free instant cooking dry noodles having water content of 13% or less by weight, and consisting essentially of at least one starch-containing component comprised mainly of wheat flour, the starch contained therein having an α-conversion degree of at least about 85% as measured by the diastase enzyme process, said noodles having a fine porous texture providing communication between the external surface of said noodles with the interior portions thereof by a network of fine pores, and being capable of transformation into an edible cooked or boiled state within a short period of time when immersed in hot water, said noodles having non-coated smooth surfaces substantially devoid of blister-like bubble-formations, said noodles being sufficiently durable and storage stable to withstand storage for at least one year without substantial change in quality, devoid of portions sticking to adjacent noodles, and yielding a non-sticky good sense, feel and taste when transformed to said edible cooked state.

8. Non-fried, oil-free instant cooking dry noodles according to claim 7 containing sodium chloride therein present in an amount of from about 0.5 to about 8% by weight, relative to the weight of said starch-containing component.

9. Non-fried, oil-free instant cooking noodles of claim 7 also containing egg yolk, dried egg yolk, frozen egg yolk or mixtures thereof.

10. Non-fried, oil-free instant cooking noodles of claim 7 also containing from about 0.5 to about 8% by weight of sodium chloride therein, relative to the weight of the starch-containing component together with egg yolk, dried egg yolk or frozen egg yolk or mixtures thereof.

11. Non-fried, oil-free instant cooking noodles of claim 10 wherein degree of $\alpha$-conversion is at least 93%.

12. Non-fried, oil-free instant cooking noodles of claim 7 or 11 having an average pore volume of about 0.07 to about 0.4 ml/g.

* * * * *